(12) United States Patent
Wu et al.

(10) Patent No.: US 9,826,467 B2
(45) Date of Patent: Nov. 21, 2017

(54) METHOD FOR ESTABLISHING ASSOCIATION BETWEEN STATION AND ACCESS POINT, AND DEVICE

(71) Applicant: Huawei Technologies Co., Ltd., Shenzhen, Guangdong (CN)

(72) Inventors: Tianyu Wu, Shenzhen (CN); Changle Li, Xi'an (CN); Hang Lin, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 14/526,218

(22) Filed: Oct. 28, 2014

(65) Prior Publication Data

US 2015/0043566 A1 Feb. 12, 2015

Related U.S. Application Data

(63) Continuation of application No. PCT/CN2013/074051, filed on Apr. 11, 2013.

(30) Foreign Application Priority Data

Apr. 28, 2012 (CN) .......................... 2012 1 0132882

(51) Int. Cl.
*H04W 48/16* (2009.01)
*H04W 76/02* (2009.01)
(Continued)

(52) U.S. Cl.
CPC ........... *H04W 48/16* (2013.01); *H04W 48/14* (2013.01); *H04W 76/02* (2013.01); *H04W 84/12* (2013.01)

(58) Field of Classification Search
CPC ..... H04W 48/16; H04W 48/14; H04W 76/02; H04W 84/12
See application file for complete search history.

(56) References Cited

U.S. PATENT DOCUMENTS 7,505,443 B2 * 3/2009 McNew ................ H04W 48/12
370/338
8,144,707 B2 * 3/2012 Zhang ................. H04L 12/1854
370/328
(Continued)

FOREIGN PATENT DOCUMENTS

CN 101541043 A 9/2009
EP 1838053 A1 9/2007
(Continued)

OTHER PUBLICATIONS

Liu et al., "Service Type Indication in Association," IEEE 802.11-12/0612r0, Institute of Electrical and Electronics Engineers, New York, New York (May 2012).
(Continued)

*Primary Examiner* — Ian N Moore
*Assistant Examiner* — Latresa McCallum
(74) *Attorney, Agent, or Firm* — Leydig, Voit & Mayer, Ltd.

(57) ABSTRACT

Embodiments of the present invention provide a method for establishing an association between a STA and an AP, and the method includes: sending, by the STA, an association request frame to the AP, where the association request frame includes a service type element, and the service type element is used for indicating a sensor service type, an offloading service type, or a hybrid service type to which the STA belongs, where the sensor service type includes a first sensor service or a second sensor service, and the offloading service type includes a first offloading service or a second offloading service; and receiving, by the STA, an association response frame sent by the AP, where the association response frame is generated by the AP after determining, according to the service type element, a service type to which the STA belongs.

16 Claims, 6 Drawing Sheets

(51) Int. Cl.
*H04W 48/14* (2009.01)
*H04W 84/12* (2009.01)

(56) References Cited

U.S. PATENT DOCUMENTS

| | | | | |
|---|---|---|---|---|
| 8,971,213 B1* | 3/2015 | Hart | ......................... | H04W 8/26 |
| | | | | 370/255 |
| 9,356,801 B2* | 5/2016 | Tamura | ............... | H04L 12/4662 |
| 2007/0263873 A1* | 11/2007 | Qi | ........................... | H04L 9/083 |
| | | | | 380/273 |
| 2009/0252165 A1* | 10/2009 | Zhang | ................. | H04L 12/1854 |
| | | | | 370/390 |
| 2011/0208229 A1 | 8/2011 | Snow et al. | | |
| 2011/0280229 A1 | 11/2011 | Montemurro et al. | | |
| 2012/0063433 A1* | 3/2012 | Wentink | ................ | H04W 76/02 |
| | | | | 370/338 |
| 2013/0070642 A1* | 3/2013 | Kim | .................. | H04W 72/0413 |
| | | | | 370/254 |
| 2013/0329620 A1* | 12/2013 | Kim | .................. | H04W 52/0229 |
| | | | | 370/311 |
| 2014/0254558 A1* | 9/2014 | Kasslin | ................. | H04W 36/36 |
| | | | | 370/331 |

FOREIGN PATENT DOCUMENTS

| | | | |
|---|---|---|---|
| EP | 2369791 A1 | 9/2011 | |
| WO | WO 2011058275 A1 | 5/2011 | |

OTHER PUBLICATIONS

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation," pp. i-372, IEEE P802.11ah™/D1.0, Institute of Electrical and Electronics Engineers, New York, New York (Oct. 2013).

* cited by examiner

| Sequence | Information |
|---|---|
| 1 | Capability |
| 2 | Monitoring interval |
| 3 | Service set identifier |
| 4 | Supported rate |
| ... | ... |
| 19 | Service type |
| Last | Self-defined by a vendor |

| Element number | Length | Service type |

A STA sends an association request frame to an AP, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service

S402

The STA receives an association response frame sent by the AP, where the association response frame is a response of the AP to the association request frame, and the service type element is used by the AP to determine a service type to which the STA belongs

FIG. 4

| Bit in a service type field | Bit 0 | Bit 1 | Bit 2 | Bit 3 | Bit 4 | Bit 5 | Bit 6 | Bit 7 |
|---|---|---|---|---|---|---|---|---|
| Definition | Sensor type subtype 1 | Sensor type subtype 2 | Sensor type subtype 3 | Sensor type subtype 4 | Sensor type subtype 5 | Offloading service subtype 1 | Data offloading service subtype 2 | Reserved |

FIG. 6

METHOD FOR ESTABLISHING ASSOCIATION BETWEEN STATION AND ACCESS POINT, AND DEVICE

CROSS-REFERENCE TO RELATED APPLICATIONS

This application is a continuation of International Patent Application No. PCT/CN2013/074051, filed on Apr. 11, 2013, which claims priority to Chinese Patent Application No. 201210132882.8, filed on Apr. 28, 2012, both of which are hereby incorporated by reference in their entireties.

TECHNICAL FIELD

Embodiments of the present invention relate to communications technologies, and in particular, to a method for establishing an association between a station STA and an access point AP in a wireless local area network, and a station device and an access point device for implementing the method.

BACKGROUND

Two major types of services, that is, a sensor (sensor) service and an offloading (offloading) service, that are completely different exist in a current wireless local area network standard (for example, 802.11ah), and their characteristics and network requirements are greatly different. The sensor (sensor) service may also be referred to as a sensor type service. Characteristics of the sensor service are that a duty cycle (duty cycle) is long, a transmitted packet is short, and the sensor service is mainly an uplink service. Characteristics of the offloading service are that a duty cycle is short, many burst services exist, a transmitted packet is long, and the offloading service is mainly a downlink service. These two types of services are different; in addition, one of the two types of services, for example, the sensor service, may be further subcategorized into a plurality of types. For example, sensors of a plurality of applications, such as, an electricity meter, a water meter, and a fire alarm, may exist in a network, and different types of sensor services obviously have different characteristics and requirements. It is necessary to consider discriminately providing different types of services for different types of services in the network, so as to meet requirements of various types of services. For example, according to service type differences, an access point (Access Point, AP) may determine different maximum idle periods (Max Idle Period), provide different frame header compression methods, determine different DTIM intervals, allocate AIDs, and the like.

However, currently, a service type is mostly indicated in a signal SIG field, where one bit in the SIG field is used to indicate a service type to which currently transmitted data belongs, so as to indicate whether the service is a sensor service or an offloading service, but subcategorization cannot be further performed. For example, the Sensor service may be categorized into an electricity meter service, a water meter service, a medical sensor service, and the like according to service types, or may be subcategorized according to lengths of duty cycles. The offloading service may be categorized into a delay-sensitive service, such as a video or an audio, and a delay-insensitive service, such as file download.

SUMMARY

Embodiments of the present invention provide a method for establishing an association between a STA and an AP, where a SIG field is used to indicate a service type and the service type can be subcategorized, to improve system performance.

A method for establishing an association between a STA and an AP includes:

sending, by the STA, an association request frame to the AP, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service; and receiving, by the STA, an association response frame sent by the AP, where the association response frame is a response of the AP to the association request frame, and the service type element is used by the AP to determine a service type to which the STA belongs.

Further, an embodiment of the present invention further provides another method for establishing an association between a STA and an AP, and the method includes:

receiving, by the AP, an association request frame sent by the STA, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service;

determining, by the AP according to the service type element in the association request frame, a service type to which the STA belongs, and generating an association response frame; and sending, by the AP, the association response frame to the STA.

Further, an embodiment of the present invention further provides a station STA, and the STA includes:

a transmit circuit, configured to send an association request frame to an AP by using an antenna, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service; and a receive circuit, configured to receive, by using the antenna, an association response frame sent by the AP, where the association response frame is a response of the AP to the association request frame, and the service type element is used by the AP to determine a service type to which the STA belongs.

Another access point includes:

a receive circuit, configured to receive, by using an antenna, an association request frame sent by a STA, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service;

a processing unit, configured to determine, according to the service type element in the association request frame, a service type to which the STA belongs, and generate an association response frame; and a sending circuit, configured to send the association response frame to the STA by using the antenna.

In the embodiments of the present invention, a STA and an AP cooperate to establish an association by sending an association request frame and responding with an association response frame. After the association is established, it is considered that a link is established, and the STA and the AP can communicate with each other. In the embodiments of the present invention, a service type element is added to the association request frame, so as to indicate a specific sensor service type, offloading service type, or hybrid service type, and a service type of the STA is indicated by means of subcategorization. In addition, it is avoided that a SIG field is used to carry a service type indication, thereby saving an information overhead.

BRIEF DESCRIPTION OF DRAWINGS

FIG. 3 is a schematic diagram of a general format of a service type element in an association request frame according to an embodiment of the present invention;

FIG. 4 is a flowchart of a method for establishing an association between a STA and an AP according to an embodiment of the present invention;

FIG. 6 is a schematic diagram of another format of a service type element in an association request frame according to an embodiment of the present invention;

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention.

Figures 1, 2:
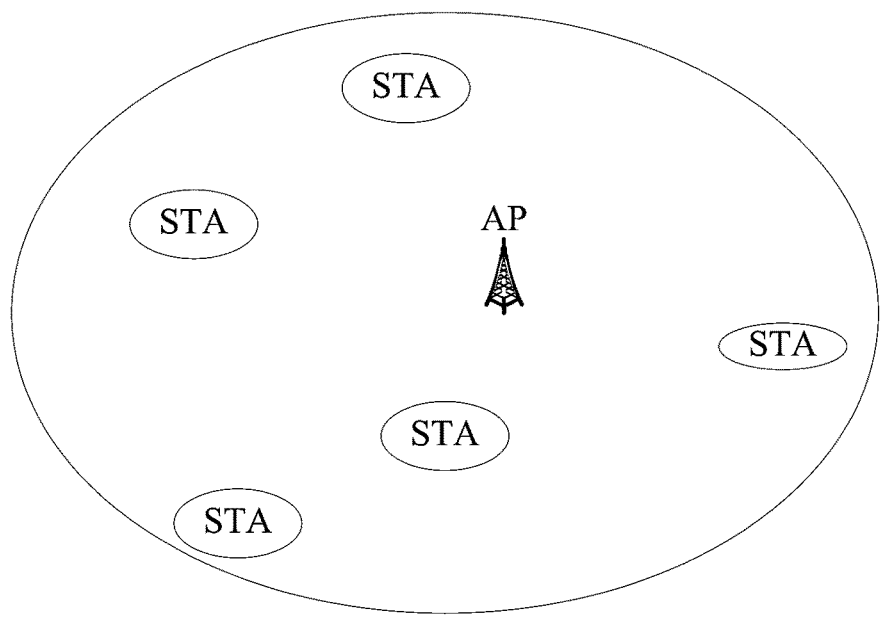
FIG. 1 is a schematic diagram of an application system according to an embodiment of the present invention.
FIG. 2 is a schematic structural diagram of an association request frame according to an embodiment of the present invention.

An embodiment of the present invention provides a method for establishing an association between a station (Station, STA) and an AP. In the method in this embodiment of the present invention, the STA may notify the AP of a subcategorized service type to which the STA belongs, so that a network can adapt to requirements of different types of services. Referring to FIG. 1, a wireless local area network includes stations STAs and an access point AP, and in a specific Internet of Things scenario, a station STA may be integrated on a specific instrument, such as a water meter or an electricity meter. The STA and the AP can perform wireless communication after establishing an association; and then related operating data on the instrument, such as the electricity meter or the water meter, may be sent to the AP, and the electricity meter or the water meter may also receive information or data sent by the AP.

An association request frame used in the method for establishing an association between a STA and an AP in this embodiment of the present invention is shown in FIG. 2. In the association request frame, in addition to a field that is commonly defined, an element (element) is added in this embodiment of the present invention. For example, the last column is used for indicating a service type to which a STA sending the association request frame belongs, where the element may be referred to as a service type element (Service type element). Further, refer to FIG. 3 for a general format of the Service type element in this embodiment of the present invention. The service type element includes: an element identifier (Element ID) field, a length (Length) field, and an information (Information) field with a variable length, where a length of each of the element identifier field and the length field is one byte in this embodiment. The Element ID field is used for indicating an identifier of the element, and a system allocates a specific Element ID to each type of element. Element IDs defined in a standard are numbered from 0 to 126, where numbers 17 to 31, 45, 47, 49, and 51 to 126 are currently reserved. Therefore, the service type element (Service type element) added in this embodiment of the present invention may use an ID, which is reserved in the standard and is not allocated, as an element identifier. That is, a numerical value may be selected from 17 to 31, 45, 47, 49, and 51 to 126. The Length field uses a length of one byte to indicate the number of bytes occupied by the Information field, and the Length field in the Service type element in this embodiment is used for indicating the number of bytes occupied by a Service Type field. The Information field in the Service type element in this embodiment is the service type (Service Type) field and is used for indicating the service type to which the STA sending the association request belongs, where a sensor service type, an offloading service type, or a hybrid service type may be indicated, and a specific type of the sensor service (or the offloading service) may be distinguished. A length of the field may be designed variable, and a plurality of indication manners may be considered to ensure that data of different service types can be indicated.

Refer to FIG. 4 for a flowchart of a method for establishing an association between a STA and an AP according to an embodiment of the present invention. The method in this embodiment on a STA side includes:

S401: The STA sends an association request frame to the AP, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service.

S402: The STA receives an association response frame sent by the AP, where the association response frame is a response of the AP to the association request frame, and the service type element is used by the AP to determine a service type to which the STA belongs.

Figure 5:
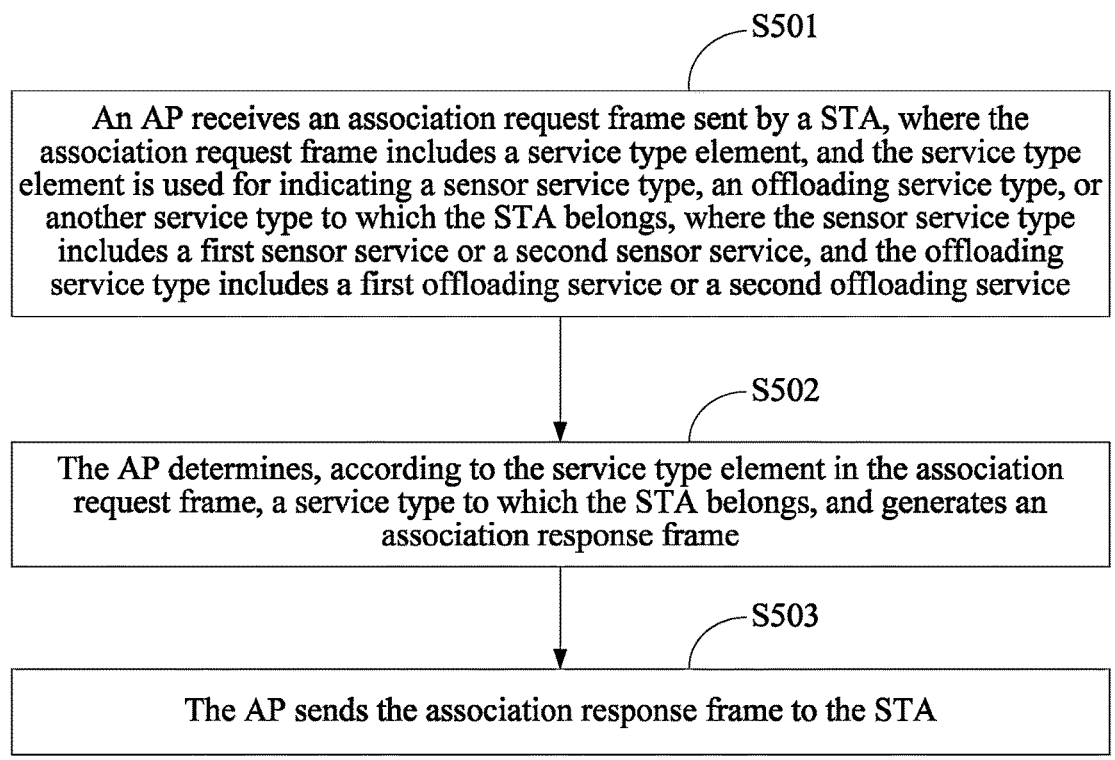
FIG. 5 is a flowchart of another method for establishing an association between a STA and an AP according to an embodiment of the present invention.

Refer to FIG. 5 for a flowchart of another method for establishing an association between a STA and an AP according to an embodiment of the present invention. The method in this embodiment of the present invention on an AP side includes:

S501: The AP receives an association request frame sent by the STA, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service.

S502: The AP determines, according to the service type element in the association request frame, a service type to which the STA belongs, and generates an association response frame.

S503: The AP sends the association response frame to the STA.

A STA and an AP cooperate to establish an association by sending an association request frame and responding with an association response frame. After the association is established, it is considered that a link is established, and the STA and the AP can communicate with each other. In this embodiment of the present invention, a service type element is added to the association request frame, so as to indicate a specific sensor service type, offloading service type, or hybrid service type, and a service type of the STA is indicated by means of subcategorization. In addition, it is avoided that a SIG field is used to carry a service type indication, thereby saving an information overhead.

Further, the AP receives the association request of the STA; learns, according to the Service type element in the received association request frame, the service type to which the STA belongs; and generates an association identifier (association identifier, AID) to be allocated to the STA. The AP places, in the association response frame, the AID to be allocated to the STA and responds to the STA with the association response frame, where the AID is an identity of the STA.

Further, a mapping table between an AID and a service type is generated in the AP, and the AID to be allocated to the current STA and the service type of the STA are added to the mapping table. The AP may perform network optimization by using the mapping table.

In the foregoing method, a frame structure is modified, and a Service type element is added to an association request frame to indicate a service type to which a STA sending the association request belongs. The Service type element, that is, an element used for indicating a service type, uses one byte in a Service Type field to indicate the service type to which the STA sending the association request belongs.

This embodiment of the present invention relates to a method for establishing an association between a STA and an AP in a wireless local area network, especially in an 802.11ah scenario. In this embodiment of the present invention, in a process of establishing an association between an AP and a STA, the STA notifies the AP of a service type to which the STA belongs, and the AP may establish a mapping table according to STAs of different service types in the network and AIDs allocated by the AP to these STAs. Therefore, the AP can use a related optimization solution according to the information, to adapt to characteristics of STAs of different types in the network and ensure that requirements of the STAs of different service types in the network can be met.

Further, the Information field in the Service type element in this embodiment of the present invention is the Service Type field and is used for indicating the service type to which the STA sending the association request belongs. The Service Type field uses one byte to indicate the service type to which the STA currently sending the association request frame belongs. For example, 00000000 is used to indicate that the service type to which the STA currently sending the association request frame belongs is a first-type sensor service, such as a periodic service; 00000001 indicates that the service type to which the STA currently sending the association request frame belongs is a second-type sensor service, such as a medical sensor service; 10000000 indicates that the service type to which the STA currently sending the association request frame belongs is a first-type offloading service, such as a delay-sensitive service; 10000001 indicates that the service type to which the STA currently sending the association request frame belongs is a second-type offloading service, such as a delay-insensitive service; 11000000 indicates that the STA belongs to another type of service, that the STA supports transmission of the first-type and second-type sensor services, and the like. One byte used herein can effectively indicate a plurality of service types, and not only can indicate a single type of service, but also can indicate another type of service, such as a hybrid type of service. One byte may have 256 indications. In a specific implementation, refer to the following table for an indication method of a service type:

| Service Type | Category |
|---|---|
| 0-127 | Sensor service |
| 128-191 | Offloading service |
| 192-255 | Another type of service |

Further, in a case in which there are not many service types, the service type field in the Service Type element may use a bitmap to indicate a service type. Referring to FIG. 6, one byte has 8 bits bit 0 to bit 7, where each bit indicates one service type. When a bit is 1, it indicates that the association request frame indicates the service type, or the association request frame indicates a service type whose value is 1 in the service type field. For example, if a value of the service type field is 00100000, it indicates that the service type of the STA sending the association request frame including the service type field is a third-type Sensor service.

In the present invention, a frame structure is modified in a process of establishing an association between a STA and an AP in the existing 802.11, and a Service type element is added to an association request frame to indicate a service type to which the STA sending the association request belongs. In the present invention, the Service type element uses a two-level indication method, where one byte is used in a Service Type field to indicate the service type to which the STA sending the association request belongs, and one byte is used in a Subtype field to indicate subcategorization of the service type.

Figure 7:
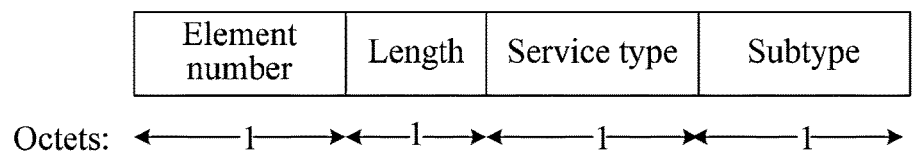
FIG. 7 is a schematic diagram of still another format of a service type element in an association request frame according to an embodiment of the present invention.

Further, refer to FIG. 7 for another schematic structural diagram of a Service type element according to an embodiment of the present invention.

An Information field in the Service type element in this embodiment includes a Service Type field and a Subtype field, used for indicating a service type to which a STA sending an association request belongs. One byte in the Service Type field in this embodiment is used to indicate a first-level service type to which the STA currently sending the association request frame belongs. For example, 00000000 is used to indicate that the service type to which the STA currently sending the association request frame belongs is a sensor type service; 00000001 indicates that the service type to which the STA currently sending the association request frame belongs is a offloading type service; and 00000010 indicates that the service type to which the STA currently sending the association request frame belongs is a hybrid type service of the sensor type service and the offloading type service. Other 3 to 255 bits are reserved. The Subtype field indicates subcategorization of the types of services in the Service type field. If information in the Service Type field indicates the sensor type service, 00000000 in the Subtype field indicates a first-type sensor service, 00000001 indicates a second-type sensor service, and the like. If information in the Service Type field indicates the Offloading service, 00000000 in the Subtype field indicates a first-type offloading service, 00000001 indicates a second-type offloading service, and the like. If information in the Service Type field indicates the hybrid type service, 00000000 in the Subtype field indicates a first-type hybrid service, 00000001 indicates a second-type hybrid service, and the like.

Further, in this embodiment of the present invention, an AID allocation method is determined on the basis that the STA indicates the service type of the STA to the AP. The AP may allocate different continuous AID sections to STAs of different service types. For example, a continuous AID is allocated to a STA with an excessively long duty cycle; in this way, it is highly probable that all bits in this AID section are 0s in a TIM (traffic indication map, traffic indication map) in a beacon (beacon frame), thereby improving efficiency of TIM compression. Alternatively, STAs whose duty cycles are synchronous are allocated to a continuous AID; in this way, continuous 1s likely occur in this AID section in a TIM, thereby also improving efficiency of a TIM compression algorithm.

Further, in this embodiment of the present invention, a method for compressing a sensor service frame header is provided on the basis that the STA indicates, to the AP, the service type to which the STA belongs.

A major service of a sensor type node is an uplink service from a STA to an AP in a single hop. Therefore, it may be considered to use a compressed frame header for this type of service.

Figure 8:
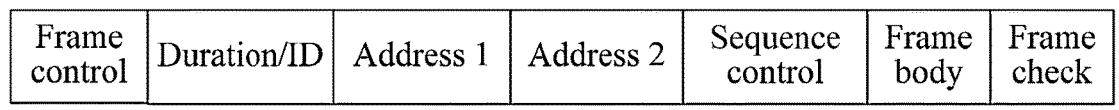
FIG. 8 is a schematic diagram of a frame header format of a sensor service.

First, in a process of establishing an association between the STA and the AP, the STA indicates, to the AP, the service type to which the STA belongs. When a STA that belongs to the sensor service type needs to transmit uplink data to the AP, a used format of a frame header is shown in FIG. 8, a compressed frame header is used, an RA and a TA are deleted, and others are reserved, where an address 1 (Address 1) indicates a sending address, namely, an SA; and an address 2 (Address 2) indicates a destination address, namely, a DA.

In the present invention, a frame structure is modified in a process of establishing an association between a STA and an AP in the existing 802.11, and a Service type element is added to an association request frame to indicate a service type to which the STA sending the association request belongs. In the present invention, a method for querying for data of a service type in a network is provided on the basis that the STA indicates, to the AP, the service type to which the STA belongs, so as to ensure that the data of the service type can be preferentially accessed.

First, in a process of establishing an association between the STA and the AP, the STA indicates, to the AP, the service type to which the STA belongs. When the AP needs to query data of a STA of a service type, for example, query data of all STAs of an electricity meter type service in a network, the AP broadcasts a query frame in the network, where a format of the frame is as follows:

| FC frame control | Duration duration | Service Type service type | FCS frame check sequence |
---

The Duration indicates duration required by the query, that is, duration in which a STA of another type not to be queried needs to back off. The Service Type indicates a service type to be queried.

A STA in the network receives the broadcasted query frame; determines, according to the Service Type and a type of the STA, whether data of the STA is queried; and if not, backs off according to the Duration, where uplink data transmission is not performed during the backoff, and backoff time is time obtained by adding the Duration and a SIFS; and if the Service Type matches that of the STA, starts to perform contention-based data transmission according to a DCF mechanism.

In this embodiment of the present invention, STAs of different types of services are scheduled to ensure that a type of service can be preferentially accessed, so that an AP obtains data in time. Under the precondition that a service type is indicated, another potential optimized modification solution may be used, for example, scheduling optimization.

An embodiment of the present invention further provides a device for implementing the foregoing method, which may be an access point AP device or a station STA device in a wireless local area network. The AP and STA devices can implement steps and procedures in the foregoing method embodiments, or in other words, the devices can establish association between the AP and the STA according to the foregoing method embodiments, where all the steps, procedures, and functions can be implemented on the devices.

Figure 9:
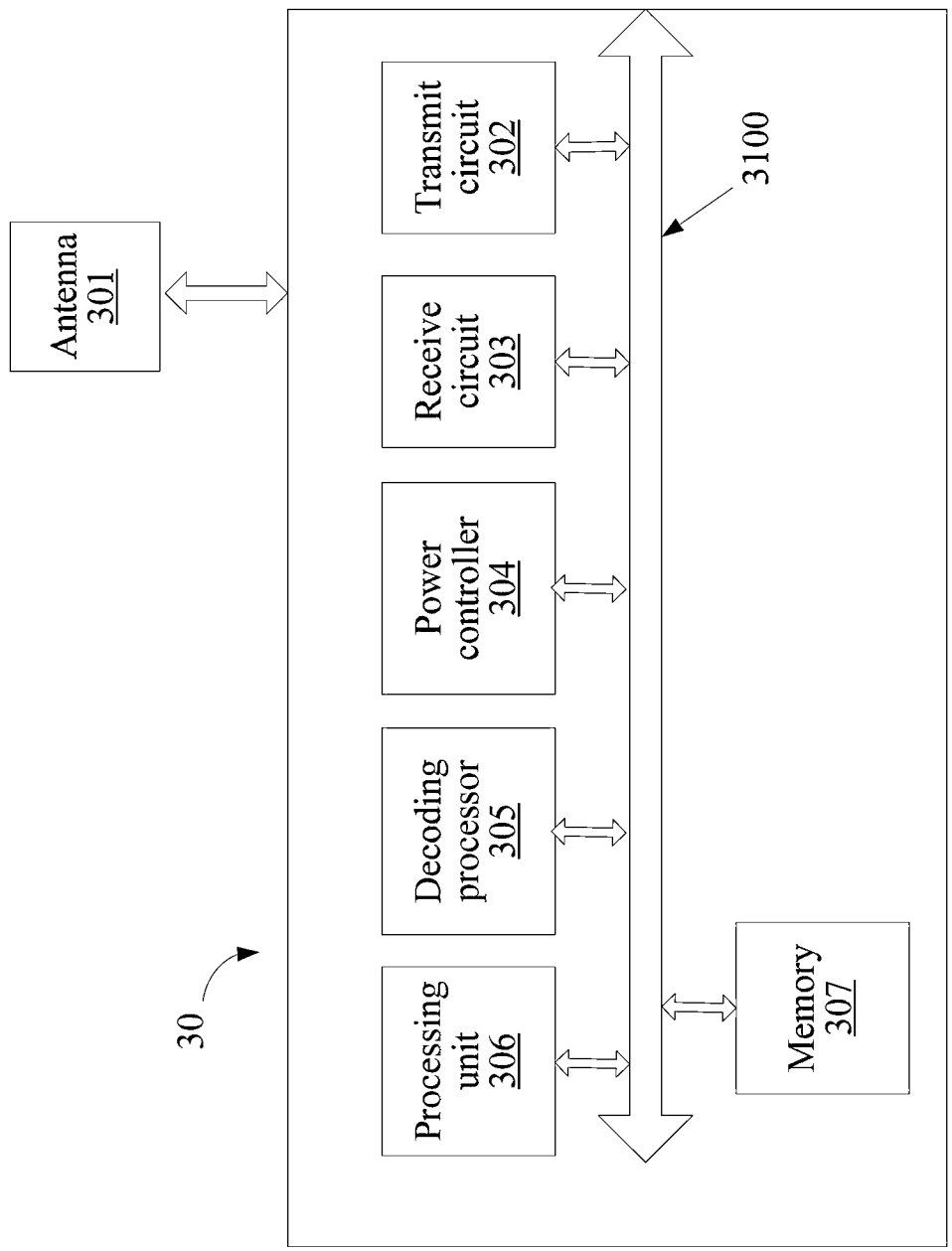
FIG. 9 is a general schematic structural diagram of an access point device according to an embodiment of the present invention.

Embodiments of the present invention may be applied to an access point AP base station or a station (terminal) in a wireless local area network. FIG. 9 shows an embodiment of an access point device. However, in some wireless local area networks, the device is an access point or a station; and may be an access point in different specific communication, and may be a station in subsequent communication. In this embodiment, a device 30 includes a transmit circuit 302, a receive circuit 303, a power controller 304, a decoding processor 305, a processing unit 306, a memory 307, and an antenna 301. The processing unit 306 controls an operation of the device 30, and the processing unit 306 may also be referred to as a CPU. The memory 307 may include a read-only memory and a random access memory, and provides an instruction and data to the processing unit 306. A part of the memory 307 may further include a non-volatile random access memory (NVRAM). In a specific application, the device 30 may be built in or may be a wireless communications device, such as a mobile phone; and may further include a carrier that contains the transmit circuit 302 and the receive circuit 303, so as to allow data transmission and reception between the device 30 and a remote location. The transmit circuit 302 and the receive circuit 303 may be coupled to the antenna 301. Components of the device 30 are coupled together by using a bus system 3100, where in addition to a data bus, the bus system 3100 includes a power bus, a control bus, and a status signal bus. However, for clear description, various types of buses in the figure are marked as the bus system 3100. The device 30 may further include the processing unit 306 configured to process a signal, and further include the power controller 304 and the decoding processor 305.

The methods disclosed in the foregoing embodiments of the present invention may be applied to the decoding processor 305, or in other words, may be implemented by the decoding processor 305. The decoding processor 305 may be an integrated circuit chip and has a signal processing capability. In an implementation process, the steps in the foregoing methods may be implemented by using a hardware integrated logic circuit in the decoding processor 305, or instructions in the form of software. These instructions may cooperate with the processor 306 for implementation and control. In practice, the decoding processor 305 may be integrated with the processor 306 or combined with the processor 306 to serve as a processing unit, configured to execute the methods disclosed in the embodiments of the present invention. The decoding processor or the processor may be a general processor, a digital signal processor (DSP), an application-specific integrated circuit (ASIC), a field-programmable gate array (FPGA), another programmable logic component, a discrete gate, a transistor logic component, or a discrete hardware component, which can implement or execute the methods, steps, and logic block diagrams disclosed in the embodiments of the present invention. The general processor may be a microprocessor, or the processor may also be any conventional processor, decoder, or the like. The steps in the methods disclosed in the embodiments of the present invention may be directly implemented by a hardware decoding processor, or may be implemented by combining hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 307, and the decoding processor reads information in the memory 307 and implements the steps of the foregoing methods in combination with hardware of the modules 301 to 307.

A station and an access point in the embodiments of the present invention are configured to implement the foregoing method embodiments, and all the steps, procedures, or functions in the method embodiments can be implemented on the devices. The access point or station devices establish an association by using the foregoing methods. The methods are specifically implemented by the station and the access point in the embodiments.

A station in an embodiment of the present invention includes:

a transmit circuit, configured to send an association request frame to an AP by using an antenna, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service; and a receive circuit, configured to receive, by using the antenna, an association response frame sent by the AP, where the association response frame is a response of the AP to the association request frame, and the service type element is used by the AP to determine a service type to which the STA belongs.

Further, the service type element in the association request frame transmitted by the transmit circuit includes: an element identifier field, a length field, and an information field, where the element identifier field is used for recording an element identifier of the service type element, the length field is used for identifying a length of the information field, the information field indicates, by using a mapping relationship between a value of the information field and a service type, the service type to which the STA belongs, and the service type includes the sensor service type, the offloading service type, or a hybrid service type. Alternatively, the service type element in the association request frame transmitted by the transmit circuit includes: an element identifier field, a length field, and an information field, where the element identifier field is used for recording an element identifier of the service type element, the length field is used for identifying a length of the information field, the information field is used for indicating, in a bitmap manner, the service type to which the STA belongs, and the service type includes the sensor service type, the offloading service type, or a hybrid service type, where the information field comprises n bits, and the service type to which the STA belongs is a service type corresponding to a bit whose value is 1. Alternatively, the service type element in the association request frame transmitted by the transmit circuit includes: an element identifier field, a length field, and an information field, where the element identifier field is used for recording an element identifier of the service type element, the length field is used for identifying a length of the information field, the information field is used for indicating the service type to which the STA belongs, and the information field includes a Service Type field and a Subtype field, where the Service Type field is used for indicating a first-level service type to which the STA currently sending the association request frame belongs, the Subtype field indicates a subcategorized type of the first-level service type in the Service type field, and the first-level service type includes the sensor service type, the offloading service type, or the hybrid service type. The service type element in the association request frame transmitted by the transmit circuit includes the Subtype field, and the indicating, by the Subtype field, a subcategorized type of the first-level service type in the Service type field includes: indicating, by a mapping relationship between a value of the Service type field and a service type, the subcategorized type of the first-level service type; or indicating, by the Service type field, the subcategorized type of the first-level service type in a bitmap manner.

An access point in an embodiment of the present invention includes:

a receive circuit, configured to receive, by using an antenna, an association request frame sent by a STA, where the association request frame includes a service type element, and the service type element is used for indicating a sensor service type, an offloading service type, or another service type to which the STA belongs, where the sensor service type includes a first sensor service or a second sensor service, and the offloading service type includes a first offloading service or a second offloading service;

a processing unit, configured to determine, according to the service type element in the association request frame, a service type to which the STA belongs, and generate an association response frame; and a sending circuit, configured to send the association response frame to the STA by using the antenna.

Further, the processing unit is further configured to, after determining, according to the service type element in the association request frame, the service type to which the STA belongs, generate an association identifier AID to be allocated to the STA, and place the AID in the association response frame, where the AID is an identity of the STA. Further, the processing unit is further configured to record, in a mapping table between an AID and a service type, the AID to be allocated to the STA, where the mapping table is used for optimizing scheduling of the STA.

Except the specifically provided circuits, units, and modules in the station and the access point in the embodiments of the present invention, general modules may be correspondingly configured according to a system requirement, so as to form mature devices.

In the embodiments of the present invention, a STA and an AP cooperate to establish an association by sending an association request frame and responding with an association response frame. After the association is established, it is considered that a link is established, and the STA and the AP can communicate with each other. In the embodiments of the present invention, a service type element is added to the association request frame, so as to indicate a specific sensor service type, offloading service type, or hybrid service type, and a service type of the STA is indicated by means of subcategorization. In addition, it is avoided that a SIG field is used to carry a service type indication, thereby saving an information overhead.

What is claimed is:

1. A method for establishing an association between a station (STA) and an access point (AP), comprising:
   sending, by the STA, an association request frame to the AP, wherein the association request frame comprises a service type element comprising an element identifier field, a length field, and an information field, used for indicating a sensor service type, an offloading service type, or another service type to which the STA belongs, wherein the sensor service type comprises a first sensor service or a second sensor service, and the offloading service type comprises a first offloading service or a second offloading service,
      wherein the element identifier field is used for recording an element identifier of the service type element, the length field is used for identifying a length of the information field and the information field is used for indicating the service type to which the STA belongs,
      wherein the information field comprises a Service Type field and a Subtype field, and
      wherein the Service Type field is used for indicating a first-level service type to which the STA currently sending the association request frame belongs, the Subtype field indicates a subcategorized type of the first-level, service type in the Service Type field, and the first-level service type comprises the sensor service type, the offloading service type, or a hybrid service type; and
   receiving, by the STA, an association response frame sent by the AP, wherein the association response frame is a response of the AP to the association request frame, and the service type element is used by the AP to determine a service type to which the STA belongs.

2. The method according to claim 1,
   wherein the element identifier field records an element identifier of the service type element, the length field identifies a length of the information field, the information field indicates, by using a mapping relationship between a value of the information field and the service type, the service type to which the STA belongs, and the service type comprises the sensor service type, the offloading service type, or a hybrid service type.

3. The method according to claim 2, wherein a length of the element identifier field is one byte, a length of the length field is one byte, and the information field is a field with a variable length.

4. The method according to claim 1,
   wherein the element identifier field records the element identifier of the service type element, the length field identifies the length of the information field, the information field indicates, in a bitmap manner, the service type to which the STA belongs, and the service type comprises the sensor service type, the offloading service type, or the hybrid service type, wherein the information field comprises n bits, and the service type to which the STA belongs is the service type corresponding to a bit in the n bits of the information field whose value is 1.

5. The method according to claim 4, wherein n is 8.

6. The method according to claim 1, wherein that the Subtype field indicates a subcategorized type of the first-level service type in the Service type field comprises:
   indicating, by a mapping relationship between a value of the Service type field and the service type, the subcategorized type of the first-level service type; or
   indicating, by the Service type field, the subcategorized type of the first-level service type in a bitmap manner.

7. A method for establishing an association between a station (STA) and an access point (AP), comprising:
   receiving, by the AP, an association request frame sent by the STA, wherein the association request frame comprises a service type element comprising an element identifier field, a length field, and an information field, used for indicating a sensor service type, an offloading service type, or another service type to which the STA belongs, wherein the sensor service type comprises a first sensor service or a second sensor service, and the offloading service type comprises a first offloading service or a second offloading service,
      wherein the element identifier field is used for recording an element identifier of the service type element, the length field is used for identifying a length of the information field, the information field is used for indicating the service type to which the STA belongs,
      wherein the information field comprises a Service Type field and a Subtype field, and
      wherein the Service Type field is used for indicating a first-level service type to which the STA currently sending the association request frame belongs, the Subtype field indicates a subcategorized type of the first-level service type in the Service Type field, and the first-level service type comprises the sensor service type, the offloading service type, or a hybrid service type; and
   determining, by the AP according to the service type element in the association request frame, a service type to which the STA belongs, and generating an association response frame; and
   sending, by the AP, the association response frame to the STA.

8. The method according to claim 7, wherein after the determining, by the AP according to the service type element in the association request frame, the service type to which the STA belongs, the AP generates an association identifier (AID) to be allocated to the STA, and places the AID in the association response frame, wherein the AID is an identity of the STA.

9. The method according to claim 8, wherein the AP records, in a mapping table between an AID and the service type, the AID to he allocated to the STA, wherein the mapping table is used for optimizing scheduling of the STA.

10. A station (STA), wherein the station comprises:
    a transmit circuit, configured to send an association request frame to an access point (AP) by using an antenna, wherein the association request frame comprises a service type element comprising an element identifier field, a length field, and an information field, used for indicating a sensor service type, an offloading service type, or another service type to which the STA belongs, wherein the sensor service type comprises a first sensor service or a second sensor service, and the offloading service type comprises a first offloading service or a second offloading service, wherein the element identifier field is used for recording an element identifier of the service type element, the length field is used for identifying a length of the information field, the information field is used for indicating the service type to which the STA belongs, wherein the information field comprises a Service Type field and a Subtype field, and wherein the Service Type field is used for indicating a first-level service type to which the STA currently sending the association request frame belongs, the Subtype field indicates a subcategorized type of the first-level service type in the Service Type field, and the first-level service type comprises the sensor service type, the offloading service type, or a hybrid service type; and a receive circuit, configured to receive, by using the antenna, an association response frame sent by the AP, wherein the association response frame is a response from the AP to the association request frame, and the service type element is used by the AP to determine a service type to which the STA belongs.

11. The station according to claim 10, wherein the element identifier field records an element identifier of the service type element, the length field identifies a length of the information field, the information field indicates, by using a mapping relationship between a value of the information field and the service type, the service type to which the STA belongs, and the service type comprises the sensor service type, the offloading service type, or a hybrid service type.

12. The station according to claim 10, wherein the element identifier field records an element identifier of the service type element, the length field identifies a length of the information field, the information field indicates, in a bitmap manner, the service type to which the STA belongs, and the service type comprises the sensor service type, the offloading service type, or a hybrid service type, wherein the information field comprises n bits, and the service type to which the STA belongs is the service type corresponding to a bit in the n bits of the information field whose value is 1.

13. The station according to claim 10, wherein the service type element in the association request frame transmitted by the transmit circuit comprises the Subtype field, and the indicating, by the Subtype field, a subcategorized type of the first-level service type in the Service type field comprises: indicating, by a mapping relationship between a value of the Service type field and the service type, the subcategorized type of the first-level service type; or indicating, by the Service type field, the subcategorized type of the first-level service type in a bitmap manner.

14. An access point (AP), wherein the access point comprises:

a processor, and a non-transitory computer-readable storage medium coupled to the processor and storing programming instructions for execution by the processor, the programming instructions instruct the processor to:

receive an association request frame sent by a station (STA), wherein the association request frame comprises a service type element comprising an element identifier field, a length field, and an information field, used for indicating a sensor service type, an offloading service type, or another service type to which the STA belongs, wherein the sensor service type comprises a first sensor service or a second sensor service, and the offloading service type comprises a first offloading service or a second offloading service, wherein the element identifier field is used for recording an element identifier of the service type element, the length field is used for identifying a length of the information field, the information field is used for indicating the service type to which the STA belongs, wherein the information field comprises a Service Type field and a Subtype field, and wherein the Service Type field is used for indicating a first-level service type to which the STA currently sending the association request frame belongs, the Subtype field indicates a subcategorized type of the first-level service type in the Service Type field, and the first-level service type comprises the sensor service type, the offloading service type, or a hybrid service type;

determine, according to the service type element in the association request frame, a service type to which the STA belongs, and generate an association response frame; and send the association response frame to the STA by using the antenna.

15. The access point according to claim 14, wherein the processor is further configured to, after determining, according to the service type element in the association request frame, the service type to which the STA belongs, generate an association identifier (AID) to be allocated to the STA, and place the AID in the association response frame, wherein the AID is an identity of the STA.

16. The access point according to claim 14, wherein the processor is further configured to record, in a mapping table between an AID and the service type, the AID to be allocated to the STA, wherein the mapping table is used for optimizing scheduling of the STA.

* * * * *